May 20, 1930. K. STROEDTER 1,759,764
SHAKING CONVEYER
Filed July 7, 1927 2 Sheets-Sheet 1
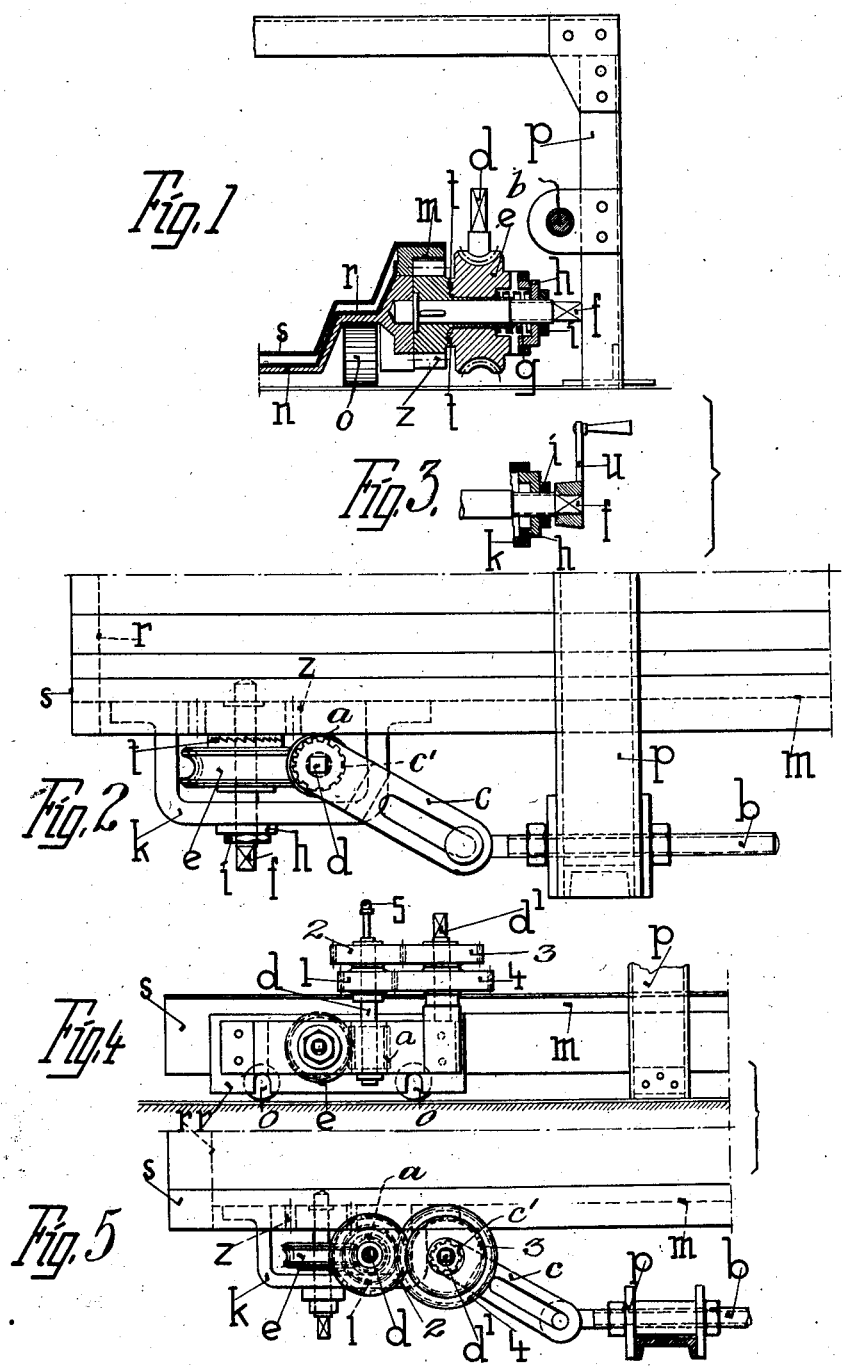
Inventor:
Karl Stroedter

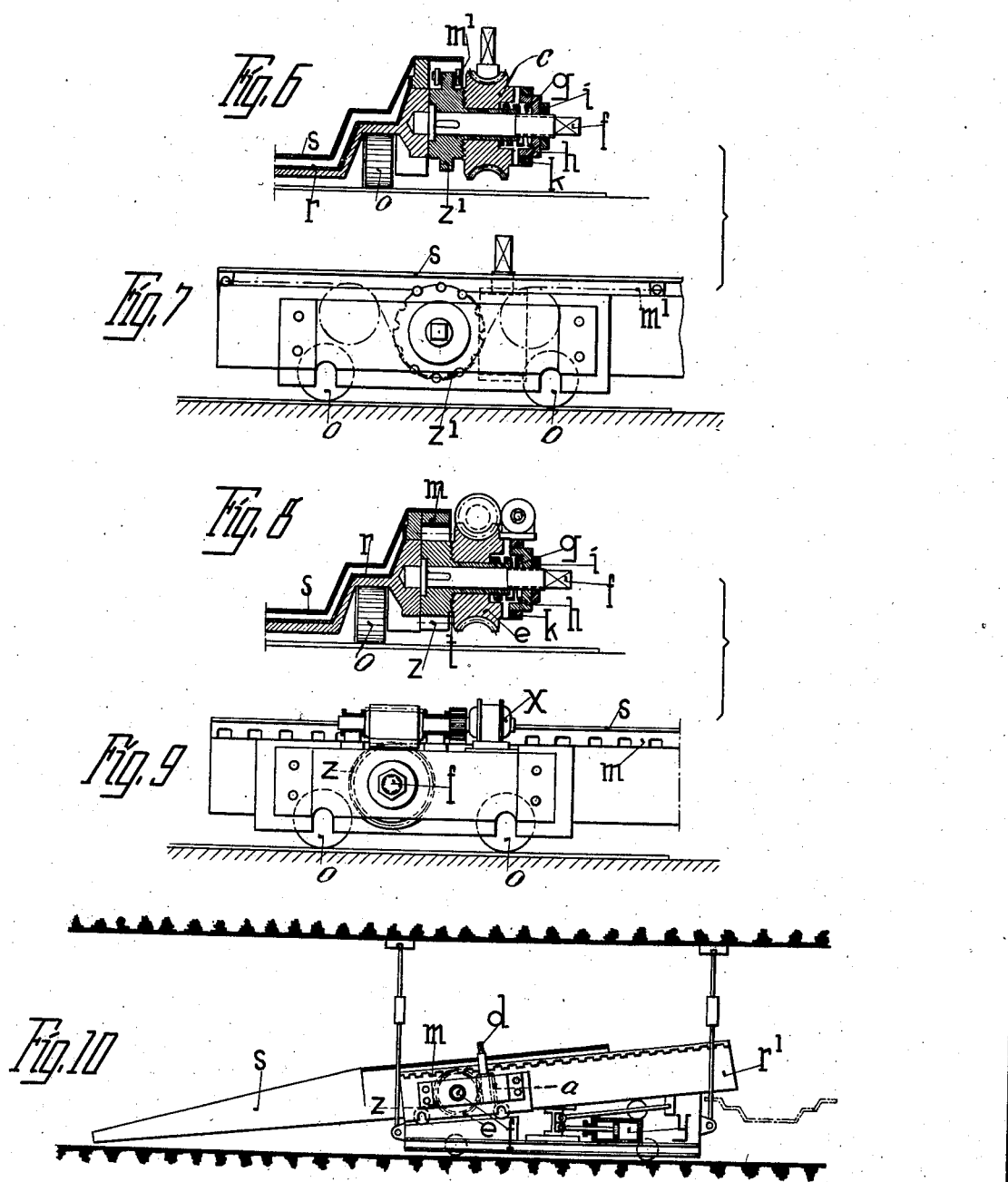

Patented May 20, 1930

1,759,764

UNITED STATES PATENT OFFICE

KARL STROEDTER, OF BOCHUM, GERMANY, ASSIGNOR TO THE FIRM GEBR. EICKHOFF MASCHINENFABRIK, OF BOCHUM, GERMANY

SHAKING CONVEYER

Application filed July 7, 1927, Serial No. 204,004, and in Germany May 21, 1927.

Shaking conveyers have already been devised in which the conveyer is equipped with a shovel coupled to the conveyer to move therewith except during the latter part of the stroke of the conveyer in one direction at which time the shovel is released and shifted forwardly relatively to the conveyer by means of a special gear.

According to the present invention a mouthpiece is permanently coupled with a conveyer member, which is moved in the manner of a shaking trough and may be a shaking conveyer or constitute a portion, moved like such a conveyer, of a loading or unloading device, this mouth piece being further adapted to be shifted longitudinally during any desired part of the shaking operation relatively to the shaking conveyer. This may be effected either by means of a gearing which is self-locking in both directions of motion and actuated by the motion of the conveyer, or by means of a gearing that is actuated independently of the conveyer. The mouthpiece thus takes part in this case in the motion of the shaking conveyer to the full extent and executes further a shifting motion relatively to the shaking conveyer portion during any desired period of the operation of the shaking conveyer, or during the whole operation thereof. In further contradistinction to the above-mentioned known device, the present design enables the relative motion of the mouth piece to be varied within very wide limits and enables the operator to vary both the length of the operation and the shifting speed, so that it is possible to effect the forward motion of the mouth piece relatively to the shaking conveyer portion of the device as long as the mouth piece has not yet come into contact with the material to be received.

In the accompanying drawing:

Figs. 1 and 2 illustrate an example of the present device in vertical section and top plan view, Fig. 3 is a detail view showing a manually operable arrangement for actuating the shovel member, Figs. 4 and 5 show another example in elevation and top view.

Figs. 6 and 7 illustrate a third embodiment in cross section and elevation,

Figs. 8 and 9 show a fourth embodiment in vertical cross section and side elevation respectively, Fig. 10 is an elevation of a fifth embodiment.

Referring first to Figs. 1 and 2, $r$ denotes a shaking trough, on which is guided a shovel piece $s$ so as to move longitudinally thereon. The shovel piece $s$ has mounted on the underside of one of its edges a rack $m$. The trough $r$ has fixed on its underside a bed piece $n$ carrying a horizontal trunnion $f$, the latter being further supported by a yoke $k$ mounted on the trough $r$. The trunnion $f$ has mounted on it a toothed wheel $z$ in mesh with the rack $m$ of the shovel piece $s$. On its outer side, the toothed wheel $z$ is provided with coupling teeth $t$ engaged by a worm wheel $e$ under the action of a spring $g$. The worm wheel $e$ may shift axially on the hub of the toothed wheel $z$. The tension of spring $g$ may be regulated by means of a cap $h$ and a nut $i$ screwed on the trunnion $f$. The worm wheel $e$ is in mesh with a worm $a$ the shaft $d$ of which is provided with a pawl and ratchet gear $c, c^1$. Arm $c$ of this gear is guided by means of a stud on an adjustable rod $b$ which in its turn is mounted on a stationary frame $p$. The conveyer $r$ is guided on rollers $o$. The whole actuating gear $z, m, e, a$ permanently reciprocates with the conveyer $r$; consequently the shovel piece $s$ takes part in this reciprocating motion too.

Owing to the shaft $d$ likewise reciprocating, the pawl lever $c$ executes a reciprocating rocking motion, whereby the shaft $d$ is turned in one or the other direction according to the position of the pawl, and the worm $a$ drives worm wheel $e$ and the latter drives the toothed wheel $z$. As the latter is in mesh with rack $m$, the shovel piece $s$ is moved relatively to the conveyer $r$ in one or the other direction during the motion of the latter. When the resistance exerted by the material on the shovel piece $s$ in this additional motion is higher than the pressure exerted by spring $g$ on the worm wheel $e$, then the teeth $t$ glide on one another, without the toothed wheel $z$ being driven, the gearing thus being secured against being overloaded. The degree of the coupling pressure may be regulated by suitably adjusting the spring $g$. Furthermore, the extent of the relative motion of the shovel piece $s$ may be adjusted by adjusting rod $b$.

When the shovel piece $s$ is to be moved forward or shifted back by hand, it is only necessary to unmesh the worm wheel $e$ from toothed wheel $z$ by hand, by loosening nut $i$, and turn the trunnion $f$ in the one or other direction by means of a crank $u$, as shown in Fig. 3.

An accelerated return of the shovel piece may further be effected mechanically, as shown in Figs. 4 and 5. In this case a gearing is inserted before the worm shaft $d$, the toothed wheels 1 and 2 thereof being mounted on shaft $d$, whilst the stepped toothed wheels 3 and 4 are fixed on a shaft $d^1$ to which in this case the pawl and ratchet gear is attached. For the forward motion of the shovel piece $s$ a spline 5 that couples wheel 1 with shaft $d$ is withdrawn, and shaft $d^1$ transmits its rotary motion through wheels 3 and 2 to shaft $d$ and worm gear $a$, $e$, and as before to toothed wheel $z$ and rack $m$. When the shovel piece is to be returned mechanically with acceleration, the spur wheel 2 is thrown out of operation, so that the rotary motion of shaft $d^1$ is accelerated through wheels 4 and 1 which are of different ratio to the wheels 3 and 2.

Instead of the toothed wheel $z$ and rack $m$, a sprocket wheel $z^1$ and a suitable chain $m^1$ may be used, as illustrated in Figs. 6 and 7, the chain being fixed on the shovel piece $s$.

Furthermore, instead of deriving the motion of the shovel gear from the motion of the shaking conveyer, said gear may receive its motion from a motor $x$ mounted on the conveyer, as illustrated in Figs. 8 and 9, this motor may be a compressed air motor or an electric one. For, in this case too the shovel piece executes its characteristic motion, viz. the reciprocating motion together with the conveyer, if, as described hereinbefore and as illustrated in Figs. 8 and 9, the gear actuating the shovel piece is in itself a self-locking one, and the shovel piece executes further a supplemental axial motion in addition and relatively to the conveyor motion, in the latter case according to the motor drive mentioned.

Fig. 10 illustrates how the described device may be designed for conveying massed goods. $y$ denotes the motor producing the conveyor motion and attached to part $r^1$ of the latter; $d$, $a$, $e$, $z$, $m$ are the gear parts that cause the relative motion of the shovel, as in the embodiments described hereinbefore.

When designed as an unloading device, the construction of the device would be practically the same, with the sole difference, however, that the shovel piece $s$ would be arranged below the conveyor piece $r^1$ and that the latter would receive the material to be conveyed, for instance rubbish for cogging purposes in mines.

In the described embodiments the worm $a$ and worm wheel $e$ are used as self-locking gear; instead of them and of the rack $m$ and toothed wheel $z$, a square-threaded screw bolt and nut or the like might be made use of as a self-locking gear.

What I claim and desire to secure by Letters Patent, is:—

1. A device of the character described comprising a shaking conveyer, a shovel member, a gearing continuously coupling the shaking conveyer to the shovel member for permitting them to reciprocate together, and means coacting with the gearing for moving the shovel member longitudinally relatively to the shaking conveyer during their reciprocation.

2. A device of the character described comprising a shaking conveyer, a shovel member, a gearing continuously coupling the shaking conveyer to the shovel member for permitting them to reciprocate together, means coacting with the gearing for moving the shovel member longitudinally relatively to the shaking conveyer during their reciprocation, and means for rendering the aforesaid means inoperative upon the shovel member being overloaded with material.

3. A device of the character described comprising a shaking conveyer, a shovel member, a gearing continuously coupling the shaking conveyer to the shovel member for permitting them to reciprocate together, means coacting with the gearing for moving the shovel member longitudinally relatively to the shaking conveyer during their reciprocation, and means for varying the speed of movement of the shovel member relatively to the shaking conveyer.

4. A device of the character described comprising a shaking conveyer, a shovel member, a gearing continuously coupling the shaking conveyer to the shovel member for permitting them to reciprocate together, means coacting with the gearing for moving the shovel member longitudinally relatively to the shaking conveyer during their reciprocation, and means for varying the throw of the shovel member as it reciprocates relatively to the reciprocating shaking conveyer.

5. A device of the character described comprising a shaking conveyer, a shovel member, a gearing continuously couping the shaking conveyer to the shovel member for permitting them to reciprocate together, means coacting with the gearing for moving the shovel member longitudinally relatively to the shaking conveyer during their reciprocation, and means for varying the speed and throw of the shovel member relatively to the shaking conveyer.

6. A device of the character described comprising a shaking conveyer, a shovel member coacting therewith, a rack associated with the shovel member, a pinion rotatably mounted on the shaking conveyer and meshing with the rack, and means for rotating the pinion as the conveyer reciprocates whereby the shovel member moves relatively thereto, said means including a provision for causing the shovel member to move with respect to the conveyer during fractions of the stroke of the latter.

7. A device of the character described comprising a shaking conveyer, a shovel member coacting therewith, a rack associated with the shovel member, a pinion rotatably mounted on the shaking conveyer and meshing with the rack, and means including a springheld coupling for rotating the pinion as the conveyer reciprocates whereby the shovel member moves relatively thereto.

8. A device of the character described comprising a shaking conveyer, a shovel member coacting therewith, a rack associated with the shovel member, a pinion rotatably mounted on the shaking conveyer and meshing with the rack, a gearing, a springheld clutch between the gearing and the pinion, a stationary member, and means for rotating the gearing from the stationary member as the shaking conveyer is reciprocated.

In testimony whereof, I have signed my name to this specification.

KARL STROEDTER.